United States Patent
Abrassart

(10) Patent No.: US 10,182,112 B2
(45) Date of Patent: Jan. 15, 2019

(54) METHOD AND DEVICE FOR EXCHANGING DATA WITH A STORAGE DEVICE OF AN AIRCRAFT

(71) Applicant: DASSAULT AVIATION, Paris (FR)

(72) Inventor: Hugues Abrassart, Saint Cloud (FR)

(73) Assignee: DASSAULT AVIATION, Paris (FR)

( * ) Notice: Subject to any disclaimer, the term of this patent is extended or adjusted under 35 U.S.C. 154(b) by 323 days.

(21) Appl. No.: 15/010,668

(22) Filed: Jan. 29, 2016

(65) Prior Publication Data

US 2016/0234309 A1     Aug. 11, 2016

(30) Foreign Application Priority Data

Feb. 5, 2015 (FR) ..................... 15 00221

(51) Int. Cl.
*H04L 29/08* (2006.01)
*G06F 15/167* (2006.01)
*H04W 4/04* (2009.01)

(52) U.S. Cl.
CPC ........ *H04L 67/1097* (2013.01); *G06F 15/167* (2013.01); *H04L 67/1095* (2013.01); *H04W 4/046* (2013.01)

(58) Field of Classification Search
CPC .. G06F 15/167; H04W 4/046; H04L 67/1095; H04L 67/1097
See application file for complete search history.

(56) References Cited

U.S. PATENT DOCUMENTS

| | | | |
|---|---|---|---|
| 7,173,526 B1* | 2/2007 | Monroe | H04N 7/181 340/3.1 |
| 7,561,037 B1* | 7/2009 | Monroe | H04N 7/181 340/3.1 |
| 7,761,544 B2* | 7/2010 | Manasseh | G07C 5/008 709/223 |
| 8,688,101 B1* | 4/2014 | Hayes | H04W 4/029 455/418 |
| 2002/0138625 A1* | 9/2002 | Bruner | H04L 29/06 709/227 |
| 2003/0067542 A1* | 4/2003 | Monroe | H04N 7/181 348/148 |
| 2004/0054748 A1 | 3/2004 | Ackaouy et al. | |

(Continued)

FOREIGN PATENT DOCUMENTS

FR    2 914 804 A1    10/2008

OTHER PUBLICATIONS

Search Report of priority application FR 15 00221.

*Primary Examiner* — Davoud A Zand
(74) *Attorney, Agent, or Firm* — Davidson, Davidson & Kappel, LLC

(57) ABSTRACT

A method for exchanging data between a storage system on the ground-based and an onboard storage system of an aircraft is provided. The method includes a first step for synchronization of a set of data contained in the ground-based storage system with a corresponding set of data of a storage memory of a data exchange device, through a communications network, a step for coupling the data exchange device to a local internal network of the aircraft connected to the storage system, and then a second step for synchronization of the set of data of the storage memory with a corresponding set of data of the onboard storage system, through the local internal network.

16 Claims, 1 Drawing Sheet

(56) References Cited

U.S. PATENT DOCUMENTS

| | | | |
|---|---|---|---|
| 2005/0256616 A1* | 11/2005 | Rhoads | H04L 67/06 701/1 |
| 2005/0258942 A1* | 11/2005 | Manasseh | G07C 5/008 340/425.5 |
| 2010/0013628 A1* | 1/2010 | Monroe | H04N 7/181 340/539.18 |
| 2010/0121938 A1 | 5/2010 | Saugnac | |
| 2011/0299454 A1 | 12/2011 | Krishnaswamy | |
| 2012/0007982 A1* | 1/2012 | Giuffrida | G01C 11/02 348/144 |
| 2013/0218961 A1* | 8/2013 | Ho | G06Q 30/02 709/204 |
| 2016/0093219 A1* | 3/2016 | Bailey | G08G 5/0013 701/120 |

\* cited by examiner

METHOD AND DEVICE FOR EXCHANGING DATA WITH A STORAGE DEVICE OF AN AIRCRAFT

This claims the benefit of French Patent Application FR 15 00221, filed Feb. 5, 2015 and hereby incorporated by reference herein.

The present invention relates to a method for exchanging data between a ground-based storage system and an onboard storage system of an aircraft.

It applies in particular to the loading of multimedia data from a storage server positioned on the ground to an internal storage memory of the aircraft, with view to the use of these data in the aircraft, notably broadcasting of multimedia document to passengers of the aircraft.

It also applies to the unloading of data, notably maintenance data, from an internal storage memory of the aircraft towards the ground-based storage server.

BACKGROUND

The data stored in the aircraft are frequently updated. Notably, multimedia documents intended to be broadcasted to passengers are frequently renewed. Such updates are made when the aircraft is on the ground, for example during refueling of the aircraft on the ground.

The loading/unloading of data in/from the storage memory of the aircraft is for example achieved either via a storage device of the USB stick or hard disc type, or through an extended communications network for example internet, notably by means of a wireless connection which is most often a paying connection, for example the Wi-Fi connection of the airport, a 3G/4G connection or a satellite connection.

Such a solution does not give entire satisfaction.

Indeed, in the case of transfer of data via a communications network, because of the significant amounts of data to be loaded/unloaded in the storage memory of the aircraft, the exchange of data generally proves to be too slow and imposes immobilization of the aircraft on the ground for a longer period than that required by simple refueling of the aircraft. Further, the use of wireless communication links, properties of third party operators generates significant costs to be paid to said operators.

In the case of transfer via a USB stick or a hard disc, there exists a risk that the data present in the USB stick or the hard disc do not correspond to the last updated version of the data to be transferred.

SUMMARY OF THE INVENTION

An object of the invention is therefore to propose a method and a device for exchanging data which may be more reliable, which may reduce the immobilization time on the ground of the aircraft required for this exchange, as well as the possible costs related to these data exchanges.

For this purpose, a method of the aforementioned type is provided, characterizing that it comprises:
- a first step for synchronization of a set of data contained in said ground-based storage system with a corresponding set of data of a storage memory of a data exchange device, through a communications network,
- a step for coupling said data exchange device to a local internal network of the aircraft connected to said onboard storage system, and then
- a second step for synchronization of the set of data of said storage memory with a corresponding set of data of said onboard storage system, through said local internal network.

The method according to the invention may comprise one or several of the following features, taken individually or according to any technically possible combination:
- said second synchronization step comprises:
  - a phase for comparing a first sub-set of data of said storage memory with a first corresponding sub-set of data of the onboard storage system, and
  - a phase for transferring data comprised in the first sub-set of the storage memory and not comprised in the first corresponding sub-assembly of the onboard storage system, from said storage memory to said onboard storage system;
- said first sub-assembly comprises multimedia data;
- said second synchronization step comprises:
  - a phase for comparing a second sub-set of data of said storage memory with a second corresponding sub-set of data of the onboard storage system, and
  - a phase for transferring data comprised in the second sub-set of the onboard storage system and not comprised in the second corresponding sub-set of the storage memory, from said onboard storage system to said storage memory;
- said second sub-set comprises maintenance data of the aircraft;
- the method further comprises, after or during the second synchronization step, a third step for synchronization of the set of data contained in said ground-based storage system with the corresponding set of data of said storage memory;
- the third synchronization step comprises:
  - a phase for comparing the second sub-set of data of said storage memory with a second corresponding sub-set of data contained in said ground-based storage system, and
  - a phase for transferring data comprised in the second sub-set of said storage memory and not comprised in the second corresponding sub-set contained in said ground-based storage system, from said storage memory to said ground-based storage system;
- said local internal network of the aircraft comprises an interface device, and the step for coupling the data exchange device with the local internal network comprises a phase for connecting said data exchange device to said interface device, notably according to a point to point link;
- the step for coupling the data exchange device with the local internal network comprises a phase for authenticating the data exchange device by the interface device, said second step for synchronization of data being applied provided that, during said authentication phase, said data exchange device has been authenticated by said interface device;
- the connection phase comprises a connection of said data exchange device to said local internal network through a wireless link, the coupling step and the second synchronization step being initiated as soon as a distance between said data exchange device and said aircraft is less than a predetermined distance;
- the connection phase comprises a connection of said data exchange device to said local internal network through a wireless link;
- the second synchronization step is at least partly applied when the aircraft is in flight, said data exchange device being located in the aircraft.
- the communication network is an extended network, notably the Internet network.

A device for exchanging device between a ground-based storage system and an onboard storage system of an aircraft is also provided, said device for exchanging data comprising a storage memory, and being configured for synchronizing a set of data contained in said ground-based storage system with a corresponding set de data of said storage memory, through a communications network, said data exchange device being further configured so as to be coupled with a local internal network of the aircraft connected to said storage device, and for synchronizing the set of data of said storage memory with a corresponding set de data of said onboard storage system, through said local internal network.

BRIEF SUMMARY OF THE DRAWINGS

The invention will be better understood upon reading the description which follows, only given as an example, and made with reference to the appended drawings, wherein.

DETAILED DESCRIPTION

Figure 1:
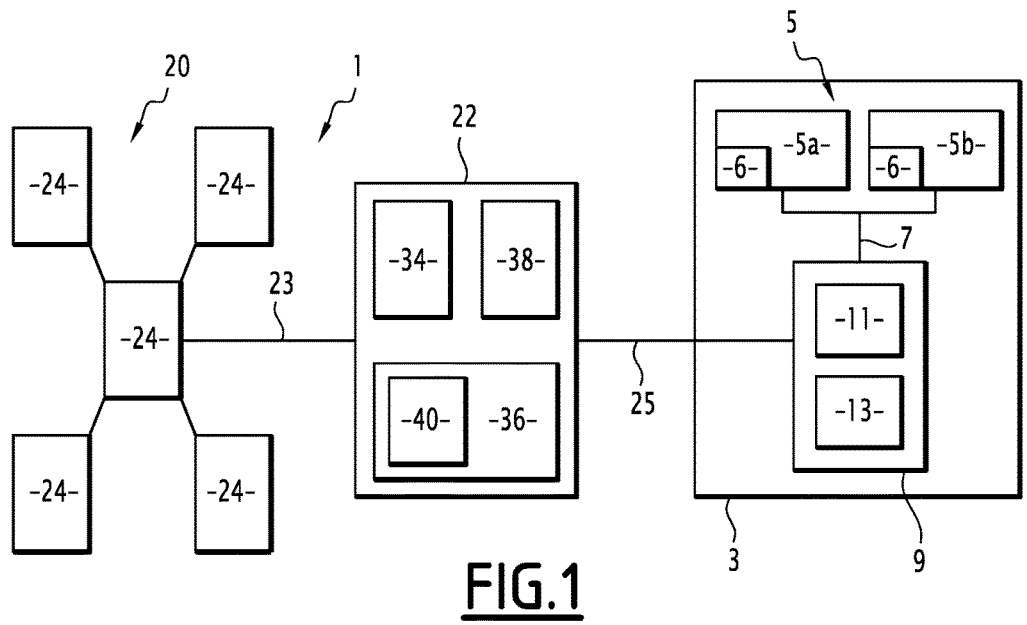
FIG. 1 is a schematic view of a facility according to an embodiment of the invention for data exchange with an aircraft.

A facility 1 for exchanging data with an internal memory of an aircraft 3 is illustrated in FIG. 1.

The aircraft 3 comprises a data storage system 5, comprising at least one, preferably at least two storage devices 5a and 5b, a first storage device 5a being dedicated to multimedia data (films, statistics of use of multimedia data), and a second storage device 5b being dedicated to the maintenance data. Each data storage device 5a, 5b for example includes a server and an internal storage memory 6.

The data storage system 5, in particular the data storage devices 5a, 5b, notably the internal storage memory 6, are loaded on board the aircraft.

By <<loaded on board>> is meant a piece of equipment or a set of equipment belonging to the aircraft, notably permanently connected to other piece of equipment of the aircraft, as opposed with pieces of equipment which would only be temporarily brought aboard the aircraft.

Moreover a device which is not an onboard device will moreover be called an external device to the aircraft. Such an external device may of course be introduced into the aircraft, without however being an onboard device.

The data storage system 5 and the data storage devices 5a, 5b will subsequently be respectively designated by the terms of onboard storage system 5 and onboard storage devices 5a, 5b.

The onboard storage system 5 is able to store a set E of data.

This set E of data comprises a first sub-set E1 of data and a second sub-set E2 of data.

The data of the first sub-set E1 are intended to be used, notably broadcast, by equipment of the aircraft.

In particular, this first sub-set E1 includes multimedia data, notably video and audio contents, intended to be broadcast by suitable equipment of the aircraft 3. Such data are for example stored in the first onboard storage device 5a.

The data of the second sub-set E2 of data for example include data for managing a flight of the aircraft 3, such as a flight plan, and maintenance data, for example comprising information relating to anomalies observed on different pieces of equipment of the aircraft 3. Such data are for example stored in the second onboard storage device 5b. The second sub-set E2 of data also includes statistical data relative to the use of these data, in particular multimedia data, in the aircraft, these statistical data being for example stored in the first onboard storage device 5a.

The aircraft 3 moreover includes a local internal network 7, connecting various pieces of equipment of the aircraft 3 to each other and allowing exchange of data between these pieces of equipment, notably between the onboard storage devices 5a, 5b and the other pieces of equipment of the aircraft 3.

The local internal network 7 is onboard the aircraft.

The local internal network 7 includes an interface device 9, forming a point for access to the local internal network 7, in particular from the outside of the aircraft 3.

Thus, the interface device 9 is configured so as to allow a connection of an external device to the aircraft 3, i.e. not onboard, to the local internal network 7.

The interface face 9 is configured for securing the data exchanges between an external device to the aircraft and the local internal network 7.

In particular, the interface device 9 comprises an identification and authentication module 11, configured for identifying an external device initiating a connection with the interface face 9, and for authenticating this identity, for example by analyzing a certificate transmitted by this external device. The identification and authentication module 11 is configured for allowing a data exchange between the external device and the local internal network 7 only if the identity of the external device is recognized as an identity for which such an exchange is allowed, and if this identity is authenticated.

The interface device 9 also comprises a data protection module 13, configured for applying one or several cryptographic protection algorithm(s) to outgoing data, i.e. transmitted from the local internal network 7 towards the outside of the aircraft 3, via the interface face 9, and to incoming data, i.e. transmitted from an external device to the local internal network 7, via the interface device 9. The cryptographic protection algorithm is for example a ciphering of the outgoing data or deciphering of the incoming data, a signature algorithm, or any other type of cryptographic algorithm.

The onboard storage devices 5a, 5b are thus configured for exchanging data with an external device to the aircraft 3, via the interface device 9 and through the local internal network 7.

In particular, the onboard storage devices 5a, 5b are configured for receiving data, notably data of the first sub-set E1, transmitted from an external device to the aircraft 3 and transmitted from this external device, via the interface device 9 and through the local internal network 7, up to the onboard storage devices 5a, 5b.

The onboard storage devices 5a, 5b are also configured for transmitting data, notably data of the second sub-set E2, to an external device to the aircraft 3.

The facility 1 is configured for exchanging data with the aircraft 3, notably with the onboard storage system 5.

In particular, the facility 1 is configured for transmitting data to the onboard storage device 5a.

The installation 1 is also configured for receiving data transmitted by the onboard storage devices 5a, 5b, notably maintenance data transmitted by the onboard storage device 5b and/or statistical data transmitted by the onboard storage device 5a.

The facility 1 is external to the aircraft 3.

The facility 1 comprises a data storage system 20 on the ground and a data exchange device 22.

The ground-based storage system 20 and the data exchange device 22 are adapted so as to be connected to each other, through a communications network 23.

The ground-based storage system 20 is configured for storing data intended to be loaded in one or several aircraft, in particular in the onboard storage device 5a of one or several aircraft, and for storing data transmitted by one or several aircraft, notably maintenance data and statistical data.

The ground-based storage system 20 is thus configured for storing one or several set(s) of data, each associated with an aircraft, notably one or several first specific sub-set(s) E1 of data intended to be loaded in one or several aircraft(s) and one or several second sub-set(s) E2 of data each received from an aircraft.

Each first sub-set E1 of data is for example selected by an operator by means of a man-machine interface of the ground-based storage system 20 or automatically configured, for example according to a subscription subscribed for the aircraft 3.

Each first sub-set of data E1 is associated with an aircraft or a set of aircraft.

Further, the ground-based storage system 20 is configured so as to be connected to the data exchange device 22, and for automatically synchronizing as soon as such a connection is effective, the data of one or several set E of data contained in the ground-based storage system 20 with the data of the corresponding set(s) contained in the data exchange device 22, as described hereafter.

The ground-based storage system 20 for example comprises a server 24, or several servers 24 connected with each other so as to be able to exchange data. For example, the servers 24 are connected together through an extended network notably the Internet network.

The data exchange device 22 is an external device to the aircraft 3. Preferably, the data exchange device 22 is however adapted so as to be brought abroad the aircraft 3.

The data exchange device 22 is configured so as to connect to the ground-based storage system 20, for example to a server 24, with view to receiving data intended to be loaded in the onboard storage system 5 and/or to transmit to the ground-based storage system 20 data received from the onboard storage system 5.

The data exchange device 22 is also configured for automatically synchronizing the data of one or several set(s) E of data contained in the ground-based storage system 20 with the data of the corresponding set(s) contained in the data exchange device 22.

In particular, the data exchange device 22 is configured for receiving from the ground-based storage system 20, data intended to be loaded into the onboard storage system 5 of the aircraft 3, in particular the first sub-set E1 of data associated with the aircraft 3, and for transmitting to the ground-based storage system 20 data received from the onboard storage system 5 of the aircraft 3, in particular the second sub-set E2 of data associated with the aircraft 3.

The data exchange device 22 is further adapted so as to be coupled with the local internal network 7 of the aircraft 3, notably for directly connecting to the local internal network 7 of the aircraft. Such a direct connection is achieved by means of a direct link 25, notably a point to point link, between the data exchange device 22 and the local internal network 7.

The data exchange device 22 is also adapted for synchronizing the data of the specific set E associated with the aircraft 3, as contained in the data exchange device 22, with the data of the corresponding set of data contained in the onboard storage system 5, as soon as the coupling between the data exchange device 22 and the local internal network 7 of the aircraft 3 is effective.

For example, the data exchange device 22 is able to connect to the interface device 9 by means of a wireless link, and the data exchange device 22 is configured for initiating coupling with the local internal network 7 and for then synchronizing the set E of data with the corresponding set E of the onboard storage system 5, as soon as the distance between the data exchange device 22 and the aircraft 3 becomes less than a predetermined distance, for example corresponding to the range of the wireless link.

The data storage device 22 is thus configured for transmitting to the onboard storage system 5 the first sub-set E1 of data associated with the aircraft 3 and for receiving from the onboard storage system 5 the second sub-set E2 of data.

The data exchange device 22 comprises a processor 34, a memory 36, and an interface module 38.

The processor 34 is adapted for executing applications contained in the memory 36.

The memory 36 comprises different memory areas containing applications intended to be executed by the processor 34, notably a data management application 40, and the data sets.

In particular, the memory 36 is adapted for storing one or several specific set(s) of E of data, each associated with one or several aircraft(s).

The memory 36 is thus adapted for storing a first sub-set E1 of data, loaded from the ground-based storage system 20 and intended to be loaded into the onboard storage system 5.

The memory 36 is also adapted for storing a second sub-set E2 of data, from the onboard storage system 5, for example des maintenance data and/or statistics, with view to their transmission to the ground-based storage system 20.

The interface module 38 is configured for allowing a connection of the data exchange device 22 to the ground-based storage system 20, via the communication network 23.

The communication network 23 is for example an extended network, notably the Internet network.

Alternatively, the communication network 23 is a local network, for example of the Ethernet type.

The connection of the data exchange device 22 to the ground-based storage system 20 is for example achieved by means of a wired connection, or a wireless link, for example a Wi-Fi link. The interface module 38 is thus adapted for establishing a wired connection and/or a wireless connection between the data exchange device 22 and the communications network 23.

The interface module 38 is also configured for allowing coupling of the data exchange device 22 with the internal local network 7 of the aircraft 3, and for allowing a data exchange between the data exchange device 22 and the internal local network 7.

The coupling of the data exchange device 22 with the internal local network 7 comprises a connection of the data exchange device 22 to the internal local network 7.

The interface module 38 is thus configured for allowing a connection of the data exchange device 22 to the local internal network 7. This connection is achieved by means of the direct link 25 between the data exchange device 22 and the internal local network 7.

By direct link, is meant a link which does not again pass through the ground-based storage system 20.

For example, the interface module 38 is configured so as to connect to the interface device 9 by means of a point to point link, the point to point link connecting by itself the interface module 38 to the interface device 9.

This link 25 is for example a wireless link, for example a Wi-Fi link. According to another example, this link is a wired link, for example according to the Ethernet standard.

Preferably, the interface module 38 is configured for allowing a connection to the interface device 9 according to several types of links, for example according to at least one wireless link type and according to at least one wired link type. Thus, the type of connection used for connecting the data exchange device 22 to the internal local network 7 may be adapted to the situation.

Thus, in certain cases, notably when a rapid loading of data is desired, the data exchange device 22 may be connected to the internal local network 7 through a wired link.

The coupling of the data exchange device 22 with the internal local network 7 moreover comprises identification and authentication of the data exchange device 22 by the interface device 9.

Thus, the interface module 38 is configured for allowing identification and authentication of the data exchange device 22 by the interface device 9.

For example, the interface module 38 is able to transmit to the interface device 9 a certificate certifying the identity of the data exchange device 22.

During the coupling, the interface module 38 is also configured so as to receive an identifier of the aircraft 3, with view to loading the specific set of data associated with this aircraft 3.

Preferably, the interface module 38 is configured for initiating coupling of the data exchange device 22 with the internal local network 7 of the aircraft 3 as soon as the distance between the aircraft 3 and the data exchange device 22 becomes less than a predetermined distance, for example corresponding to the range of a wireless link between the interface module 38 and the interface device 9.

The interface module 38 is further configured for applying one or several cryptographic protection algorithm(s) to outgoing data, notably transmitted from the data exchange device 22 to the onboard storage system 5, and to incoming data. The cryptographic protection algorithm is for example a ciphering of the outgoing data or a deciphering of the incoming data, a signature algorithm, or any other type of cryptographic algorithm.

The data management application 40 is configured for managing the data transfers from and to the memory 36.

The data management application 40 is thus configured for detecting a connection of the data exchange device 22 to the ground-based data storage system 20, and for initiating, as soon as this connection is detected, synchronization of the set E of data between the ground-based storage system 20 and the memory 36.

Notably, the data management application 40 is adapted for loading the first sub-set E1 of data into the memory 36, from the ground-based storage system 20.

Preferably, when the data exchange device 22 is connected to the data storage system 20, the data management application 40 is able to periodically compare the data of the first sub-set stored in the memory 36 with the first corresponding sub-set in the ground-based storage system 20, and to update the data stored in the memory 36 if difference are observed, i.e. to be loaded into the memory 36, from the ground-based storage system 20, the data comprised in the first sub-set of the ground-based storage system 20 and not comprised in the first corresponding sub-set of the memory 36.

Thus, if a first specific sub-set E1 of data associated with the aircraft 3 has been loaded into the memory 36, any modification of this first specific sub-set E1 in the storage system 20 will also be carried out in the memory 36.

Moreover, the data management application 40 is configured for loading the second sub-set E2 of data from the memory 36 to the ground-based storage system 20, in order to periodically compare the data of the second sub-set stored in the memory 36 with the data of the second sub-set stored in the ground-based storage system 20, and for transferring towards the ground-based storage system 20 the data comprised in the second sub-set of the memory 36 and not comprised in the second corresponding sub-set of the ground-based storage system 20.

The data management application 40 is thus able to synchronize at any moment, when the data exchange device 22 is connected to the ground-based storage system 20, the specific set(s) of data stored in the memory 36 with the corresponding specific sets in the ground-based storage system 20.

Moreover, the data management application 40 is configured for detecting a coupling of the data exchange device 22 with the local internal network 7, and for initiating, as soon as this coupling is detected, synchronization of the set E of data between the memory 36 and the onboard storage system 5, via the local internal network 7, depending on the identifier of the aircraft, received by the interface module 38.

Notably, the data management application 40 is adapted for transmitting the first sub-set E1 of data from the memory 36 to the onboard storage system 5.

Preferably, when the data exchange device 22 is coupled with the local internal network 7, the data management application 40 is able to compare the data of the first sub-set stored in the onboard storage system 5 with the data of the first sub-set in the memory 36, and update the data stored in the onboard storage system 5 if differences are observed, i.e. to load in the onboard storage system 5, from the memory 36, the data comprised in the first sub-set into the memory 36 and not comprised in the first corresponding sub-set of the onboard storage system 5.

Moreover, the data management application 40 is configured for initiating the loading of the second sub-set E2 of data from the data storage system 5 to the memory 36, in order to periodically compare the data of the second sub-set stored in the memory 36 with the data of the second sub-set stored in the data storage system 5, and for transferring towards the memory 36, the data comprised in the second sub-set of the data storage system 5 and not comprised in the second corresponding sub-set of the memory 36.

The data management application 40 is thus able to synchronize at any moment, when the data exchange device 22 is connected to the local internal network 7, the data stored in the onboard storage system 5 with the specific corresponding set of data in the memory 36.

Figure 2:
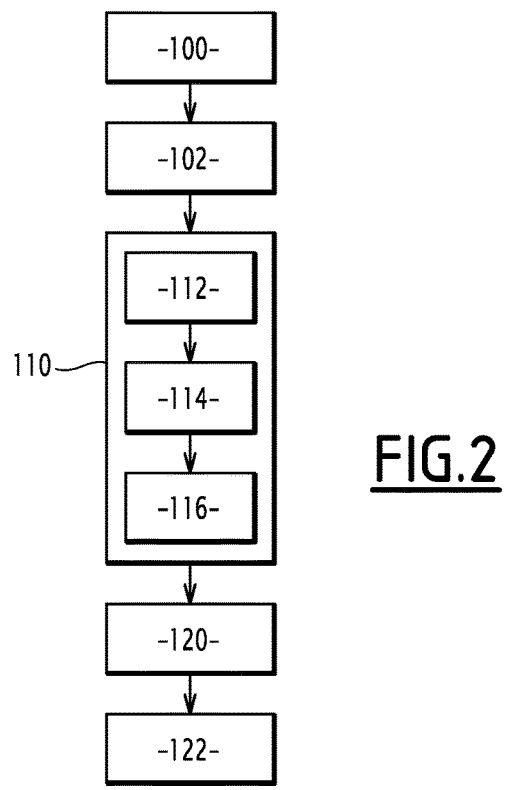
FIG. 2 is a flow chart illustrating the main steps of an embodiment according to the invention, applied by means of a facility of FIG. 1.

Further, when the data exchange device 22 is coupled with the local internal network 7, the data management application 40 is configured for controlling a transfer of internal data of the aircraft 3, notably maintenance data, from the onboard storage system 5 into the memory 36. A method for exchanging data between the ground-based storage system 20 and the aircraft 3, by means of the data exchange device 22, will now be described with reference to FIG. 2.

This method comprises a step 100 for establishing a connection between the ground-based storage system 20 and the data exchange device 22.

During step 100, the data exchange device 22 connects, via its interface module 38, to a server 24 of the ground-based storage system 20, via the communications network 23. This connection is for example achieved by means of a wired link, or a wireless link.

The method then comprises a first step 102 for synchronization of data between the ground-based storage system 20 and the data exchange device 22.

The first step 102 for synchronization of the data is applied as soon as the connection between the ground-based storage system 20 and the data exchange device 22 is effective.

During step 102, one or several specific set(s) E of data, comprising the specific set E of data associated with the aircraft 3, are synchronized between the ground-based storage system 20 and the data exchange device 22, through the communications network 23.

In particular, during step 102, the data management application 40 loads into the memory 36, from the ground-based storage system 20, a first sub-set E1 of data associated with the aircraft 3.

Further, during step 102, as long as the data exchange device 22 remains connected to the data storage system 20, the data management application 40 periodically compares the data of the first sub-set stored in the memory 36 to the data of the first corresponding sub-set in the ground-based storage system 20, and updates the data stored in the memory 36 if differences are observed.

Thus, a first sub-set E1 of data associated with the aircraft 3 having been loaded into the memory 36, any modification of this first sub-set E1 in the storage system 20 is also carried out in the memory 36.

The method then includes a step 110 for coupling the data exchange device 22 with the local internal network 7 of the aircraft 3.

The coupling step 110 comprises a phase 112 for direct connection of the data exchange device 22 to the local internal network 7.

During the connection phase 112, the interface module 38 of the data exchange device 22 connects to the interface device 9 of the local internal network 7. This connection is achieved by means of the direct link 25 between the data exchange device 22 and the internal local network 7, in particular between the interface module 38 and the interface device 9.

In this example, the link 25 is a point to point wireless link for example a Wi-Fi link. This is a local Wi-Fi link established by means of the equipment of the aircraft and of the data exchange device 22 so that the exchange of data is carried out without any cost related to the use of the communication network which are made available by third party operators (airport Wi-Fi, 3G/4G, satellite link).

Further, the connection phase 112 is initiated as soon as the distance between the data exchange device 22 and the aircraft 3 becomes less than a predetermined distance, corresponding to the range of the wireless link used for this connection. For example, the data exchange device 22 being on the ground, in an airport, the connection phase 112 is initiated following landing of the aircraft 3, as soon as the wireless link between the data exchange device 22 and the aircraft 3 becomes possible.

The coupling step 110 then comprises a phase 114 for authentication of the data exchange device 22 by the interface device 9.

During the phase 114, the identification and authentication module 11 identifies the data exchange device 22 and checks the authenticity of this identity, for example by analyzing a certificate transmitted by the interface module 38.

Subsequent to the phase 114, an exchange of data between the data exchange device 22 and the local internal network 7 is allowed by the identification and authentication module 11 only if the identity of the data exchange device 22 is recognized as an identity for which such an exchange is allowed, and if this identity is authenticated.

The coupling step 110 also comprises a phase 116 for identifying the aircraft 3 by the data exchange device 22, for example by means of an identifier transmitted by the interface device 9 and received by the interface module 38. Such an identification allows the data exchange device 22 to subsequently transmit to the aircraft 3 the data specifically intended for this aircraft, i.e. the specific set E of data associated with the aircraft 3.

As soon as the coupling between the data exchange device 22 and the local internal network 7 of the aircraft 3 is effective, a second step 120 for synchronization of data between the memory 36 of the data exchange device 22 and the onboard storage system 5, through the local internal network 7, is applied.

During this step 120, the data management application 40 transmits to the onboard storage system 5 the first sub-set E1 of data associated with the aircraft 3, depending on the identity of the aircraft 3 determined during phase 116.

The data are transferred through the link 25 directly connecting the data exchange device 22 and the interface device 9, which in the described example is a wireless link.

This transfer is automatically achieved without it being necessary to handle the data exchange device 22 for bringing it in proximity to the aircraft 3.

The data are transmitted by the interface module 38, as far as the interface device 9, and then as far as the onboard storage system 5 through the local internal network 7.

Preferably, as long as the data exchange device 22 is coupled with the local internal network 7, the data management application 40 compares the data of the first sub-set stored in the onboard storage system 5 with the data of the first sub-set associated with the aircraft 3 in the memory 36. Moreover, the data management application 40 updates the data stored in the onboard storage system 5 if differences are observed, by transferring, from the storage memory 36 to the onboard storage system 5, the data comprised in the first sub-set of the memory 36 and not comprised in the first corresponding sub-set of the onboard storage system 5.

The data management application 40 thus synchronizes at any moment, as long as the data exchange device 22 remains connected to the local internal network 7, the data stored in the onboard storage system 5 with the first corresponding sub-set of data in the memory 36.

Moreover, during step 120, the data management application 40 controls a transfer of data internal to the aircraft 3, notably maintenance data, from the onboard storage system 5 into the memory 36, with a view to their transfer to the ground-based storage system 20.

Notably, the data management application 40 compares the second sub-set of data of the memory 36 with the second corresponding sub-set of data of the onboard storage system 5 and transfers, from the onboard storage system 5 towards the memory 36, the data comprised in the second sub-set of the onboard storage system 5 and not comprised in the second corresponding sub-set of the memory 36.

During a third step 122 for synchronization of data, applied during or after the second data synchronization step 120, the first and the second sub-set of data are again synchronized between the ground-based storage system 20 and the data exchange device 22.

During step 122, the data management application 40 loads into the ground-based storage system 20, from the memory 36, the second sub-set E2 of data associated with the aircraft 3, as received and/or updated during step 120.

Further, as long as the data exchange device 22 remains connected to the data storage system 20, the data management application 40 periodically compares the data of the second sub-set stored in the memory 36 with the data of the second corresponding sub-set in the ground-based storage system 20 and updates the data stored in the ground-based storage system 20 if differences are observed.

Thus, a second sub-set E2 of data associated with the aircraft 3 having been loaded into the storage system 20, any modification of this second sub-set E2 in the memory 36 is also carried out in the storage system 20.

Preferably, the exchanges of data between the data exchange device 22 and the local internal network 7 are secured.

For example, during step 120, the interface module 38 and the data protection module 13 apply one or several cryptographic protection algorithm(s) to the data transmitted from the data exchange device 22 towards the local internal network 7, and/or transmitted from the local internal network 7 to the data exchange device 22.

The cryptographic protection algorithm is for example a ciphering of the outgoing data or a deciphering of the data, a signature algorithm, or any other type of cryptographic algorithm.

The method according to the invention thus allows rapid transmission of a large amount of data from a ground-based storage system to a memory of an aircraft, by minimizing the immobilization time on the ground-based required for this transfer.

Indeed, the data transmission from the ground-based storage system 20 in the memory 36 of the data exchange device 22, through the communications network 23, gives the possibility of having at any moment in the data exchange device 22 an updated set of data, ready to be transferred into the aircraft 3, without any handling by an operator other than an initial connection of the data exchange device 22 to the ground-based storage system 20 is required.

It is thus possible to have in the ground-based storage system 20 a general database and to load into the data exchange device 22 only specific set(s) of data intended to be loaded in one or several aircraft(s).

Further, the loading of the data from the memory 36 of the data loading device 22 into the onboard storage system 5, directly through the local internal network 7, gives the possibility of obtaining very rapid loading of these data into the onboard storage system 5.

Moreover, the authentication phase of the data exchange device 22 by the interface device 9 gives the possibility of securing the exchanges of data between the data exchange device 22 and the aircraft 3.

Preferably, the data exchange device 22 is connected to the local internal network 7 through a wireless link, and the synchronization of the data from the device 22 to the aircraft 3 is initiated as soon as the aircraft 3 is in the range area of this wireless link. Thus, it is possible to maintain the data exchange device 22 in a fixed location, in particular in an airport, the synchronization of the data in the aircraft 3 being carried out automatically as soon as the aircraft 3 is present in the airport. The handling operations required for transfer of data are therefore minimized, which gives the possibility of accelerating the loading of the data to and/or from the aircraft 3.

Nevertheless, according to an alternative, the data exchange device 22 may be brought onboard the aircraft 3, which gives the possibility of continuing to transfer the data, after the take-off of the aircraft 3, during a flight of the aircraft 3. Moreover, according to this alternative, the data exchange device 22 may be again connected to the ground-based storage system 20, once the flight is carried out, from a distant site.

Moreover, according to an embodiment, the facility 1 comprises, in addition to the ground-based storage system 20, several devices 22 for loading data, each comprising one or several specific sets of data, each associated with one or several aircraft. For example, a first data exchange device 22 comprises specific sets of data associated with a first set of aircraft, and a second data exchange device 22 comprises specific sets of data associated with a second set of aircraft, disconnected from the first set of aircraft. Alternatively, certain devices 22 for loading data comprise the same data, and are therefore redundant.

According to an alternative, the data exchanges between the data exchange device 22 and the local internal network 7, notably the exchanges of multimedia data, are not secured.

What is claimed is:

1. A method for exchanging data between a ground-based storage system and an onboard storage system of an aircraft, the method comprising:
   a first synchronization step of synchronizing of a set of data contained in the ground-based storage system with a corresponding set of data of a storage memory of a data exchanger, through a communications network;
   coupling the data exchanger with a local internal network of the aircraft connected to the on board storage system; and then
   a second synchronization step of synchronizing of the set of data of the storage memory with a corresponding set of data of the onboard storage system, through the local internal network, the second synchronization step being applied at least partly when the aircraft is in flight, the data exchanger being located in the aircraft.

2. The method as recited in claim 1 wherein the second synchronization step comprises:
   a phase of comparing a first sub-set of data of the storage memory with a first corresponding sub-set of data of the onboard storage system, and
   a phase of transferring data comprised in the first sub-set of the storage memory and not comprised in the first corresponding sub-set of the onboard storage system, from the storage memory to the onboard storage system.

3. The method as recited in claim 2 wherein the first sub-set comprises multimedia data.

4. The method as recited in claim 1 wherein the second synchronization step comprises:
   a phase of comparing a second sub-set of data of the storage memory with a second corresponding sub-set of data of the onboard storage system, and
   a phase of transferring data comprised in the second sub-set of the onboard storage system and not comprised in the second corresponding sub-set of the storage memory, from the onboard storage system towards the storage memory.

5. The method as recited in claim 4 wherein the second sub-set comprises maintenance data of the aircraft.

6. The method as recited in claim 1 further comprising, after or during the second synchronization step, a third synchronization step of synchronizing the set of data contained in the ground-based storage system with the corresponding set of data of the storage memory.

7. The method according to claim 6 wherein the second synchronization step comprises:
   a phase of comparing a second sub-set of data of the storage memory with a second corresponding sub-set of data of the onboard storage system, and
   a phase of transferring data comprised in the second sub-set of the onboard storage system and not comprised in the second corresponding sub-set of the storage memory, from the onboard storage system towards the storage memory;
the third synchronization step comprising:
   a phase of comparing the second sub-set of data of the storage memory with a second corresponding sub-set of data contained in the ground-based storage system, and
   a phase of transferring data comprised in the second sub-set of the storage memory and not comprised in the second corresponding sub-set contained in the ground-based storage system, from the storage memory toward the ground-based storage system.

8. The method as recited in claim 1 wherein the local internal network of the aircraft comprises an interfacer, the coupling the data exchanger with the local internal network comprising a phase of connecting the data exchanger to the interfacer.

9. The method as recited in claim 8 wherein the phase of connecting the data exchanger to the interfacer is according to a point to point link.

10. The method as recited in claim 8 wherein the coupling the data exchanger to the local internal network comprises a phase of authenticating the data exchanger by the interfacer, the second synchronization step being applied provided that, during the authentication phase, the data exchanger has been authenticated by the interfacer.

11. The method as recited in claim 8 wherein the phase of connecting comprises connecting the data exchanger to the local internal network through a wireless link, the coupling the data exchanger with the local internal network of the aircraft and the second synchronization step being initiated as soon as a distance between the data exchanger and the aircraft is less than a predetermined distance.

12. The method as recited in claim 8 wherein the phase of connecting comprises connecting the data exchanger to the local internal network through a wired connection.

13. The method as recited in claim 1 wherein the communications network is an extended network.

14. The method as recited in claim 1 wherein the first synchronization step is carried out before landing of the aircraft and the coupling step is carried out after landing of the aircraft.

15. The method as recited in claim 1 wherein after the second synchronization step and the flight of the aircraft, the data exchanger is again connected to the ground-based storage system, from a distant site.

16. A data exchanger for exchanging data between a ground-based storage system and an onboard storage system of an aircraft, the data exchanger comprising:
   a storage memory, and being configured so as to synchronize a set of data containing in the ground-based storage system with a corresponding set of data of the storage memory, through a communications network, the data exchanger being further configured so as to be coupled with a local internal network of the aircraft connected to the onboard storage system and for synchronizing the set of data of the storage memory with a corresponding set of data of the onboard storage system through the local internal network,
   the data exchanger being configured such that the synchronizing of the set of data of the storage memory with the corresponding set of data of the onboard storage system is applied at least partly when the aircraft is in flight, the data exchanger being located in the aircraft.

* * * * *